United States Patent
Kikkawa et al.

(10) Patent No.: US 8,684,841 B2
(45) Date of Patent: Apr. 1, 2014

(54) STORAGE MEDIUM HAVING GAME PROGRAM STORED THEREON AND GAME APPARATUS

(75) Inventors: Hitoshi Kikkawa, Kai (JP); Kazuyuki Nakamura, Kai (JP); Katsuhiro Sakoda, Kai (JP)

(73) Assignees: Nintendo Co., Ltd., Kyoto (JP); Hal Laboratory Inc., Tokyo (JP)

( * ) Notice: Subject to any disclaimer, the term of this patent is extended or adjusted under 35 U.S.C. 154(b) by 1118 days.

(21) Appl. No.: 11/352,356

(22) Filed: Feb. 13, 2006

(65) Prior Publication Data

US 2006/0217196 A1   Sep. 28, 2006

(30) Foreign Application Priority Data

Mar. 14, 2005 (JP) ................................ 2005-071079

(51) Int. Cl.
*A63F 13/06* (2006.01)

(52) U.S. Cl.
USPC ............................................. 463/37; 463/43

(58) Field of Classification Search
USPC ......................................................... 463/30
See application file for complete search history.

(56) References Cited

U.S. PATENT DOCUMENTS

| | | | |
|---|---|---|---|
| 5,863,248 A | | 1/1999 | Mine et al. |
| 6,179,619 B1 * | | 1/2001 | Tanaka ............................ 434/69 |
| 6,196,917 B1 * | | 3/2001 | Mathias et al. .................... 463/2 |
| 6,217,449 B1 | | 4/2001 | Kaku |
| 6,234,901 B1 | | 5/2001 | Nagoshi et al. |
| 6,288,705 B1 * | | 9/2001 | Rosenberg et al. ........... 345/163 |
| 6,398,647 B1 | | 6/2002 | Hirai et al. |
| 7,037,197 B2 * | | 5/2006 | Watanabe ....................... 463/30 |
| 7,637,813 B2 * | | 12/2009 | Katayama et al. .............. 463/31 |
| 7,695,356 B2 * | | 4/2010 | Fujioka et al. .................... 463/3 |
| 8,167,692 B2 * | | 5/2012 | Katayama et al. ................ 463/1 |
| 2002/0036618 A1 | | 3/2002 | Wakai et al. |
| 2002/0090993 A1 | | 7/2002 | Koshiro et al. |
| 2002/0105503 A1 | | 8/2002 | Oueslati et al. |
| 2002/0142835 A1 * | | 10/2002 | Nakazato ....................... 463/31 |
| 2003/0076302 A1 | | 4/2003 | Langstraat |
| 2003/0195039 A1 | | 10/2003 | Orr et al. |
| 2004/0224757 A1 * | | 11/2004 | Yamamura et al. ............. 463/30 |
| 2004/0224775 A1 | | 11/2004 | Wood et al. |

(Continued)

FOREIGN PATENT DOCUMENTS

| | | |
|---|---|---|
| JP | 06-285259 | 10/1994 |
| JP | 2002-939 | 1/2002 |

OTHER PUBLICATIONS

Persson, Markus. Miners4k. Dec 4, 2005. <http://www.javaunlimited.net/games/view.php?id=54>.*
Drawing Games. <http://www.freewebarcade.com/drawing-games.php>.*

(Continued)

*Primary Examiner* — Seng H Lim
(74) *Attorney, Agent, or Firm* — Nixon & Vanderhye, P.C.

(57) ABSTRACT

A storage medium having stored thereon a game program executable by a computer 21 of a game apparatus 1 including touch coordinate pair input means for outputting coordinate information based on a predetermined coordinate system in accordance with a touch operation performed by a player. A first object P1 and a second object P2 are displayed on a display screen based on first object position data DC3 and second object position data DC5. While input coordinate pairs are being detected, the first object position data DC3 is updated based on the input coordinate pairs. The second object position data DC5 is updated based on the first object position data DC3.

12 Claims, 11 Drawing Sheets

(56) References Cited

U.S. PATENT DOCUMENTS

| | | | |
|---|---|---|---|
| 2005/0197186 A1* | 9/2005 | Ohta | 463/30 |
| 2005/0221893 A1* | 10/2005 | Ohta | 463/36 |
| 2006/0089197 A1* | 4/2006 | Ajioka | 463/31 |
| 2006/0094502 A1* | 5/2006 | Katayama et al. | 463/31 |
| 2006/0094503 A1* | 5/2006 | Ajioka et al. | 463/32 |
| 2006/0258453 A1* | 11/2006 | Kando | 463/36 |
| 2006/0258455 A1* | 11/2006 | Kando | 463/36 |
| 2007/0155452 A1* | 7/2007 | Fujioka et al. | 463/1 |
| 2008/0026843 A1* | 1/2008 | Nakasaka | 463/37 |
| 2008/0119268 A1* | 5/2008 | Kando et al. | 463/31 |
| 2008/0146328 A1* | 6/2008 | Ishii et al. | 463/31 |
| 2010/0022304 A1* | 1/2010 | Katayama et al. | 463/31 |

OTHER PUBLICATIONS

Long, Dave. Kirby Canvas Curse. Nov. 7, 2005. <http://www.gamerdad.com/detail.cfm?itemID=2396>.*

Line Runner. <http://armorgames.com/play/161/line-runner>.*

Lemmings Revolution Review. May 22, 2000. <http://www.gamespot.com/pc/puzzle/lemmingsrevolution/review.html?tag=tabs;reviews>.*

Sonic the Hedgehog: "Cheats for Sonic the Hedgehog Advance for Gameboy Advance." Giga_wa. Aug. 7, 2004. <http://web.archive.org/web/20040807202656/http://www.computerunderground.com/game/Gameboy+Advance/Sonic+The+Hedgehog+Advance/index.html>.*

Snake (released mid 1970s): <http://en.wikipedia.org/wiki/Snake_(video_game).*

Japanese Official Action issued for Japanese Patent No. 2005-071079, dated Jan. 28, 2011.

Weekly Famitsu, vol. 20, No. 6, Enterbrain. co. jp., Feb. 11, 2005, p. 65, partial translation.

Ign "Yoshi's Touch & Go", Internet Video, May 26, 2004, http://lmedia.ds.ign.com/media/682/682834/vids 6.html, 3 pages from Internet and disk containing video.

Miguel Gomez, "Game Programming Gems 3:2.7 Coping with Friction in Dynamic Simulations", Charles River Media, 2002.

"Weekly Famitsu", vol. 19, No. 46, Enterbrain Inc., accepted by the reference library of Japanese Patent Office on Oct. 29, 2004, p. 34, with a partial translation.

Search Report issued on Mar. 31, 2006 in European Application No. 05018899.4.

* cited by examiner

F I G. 3
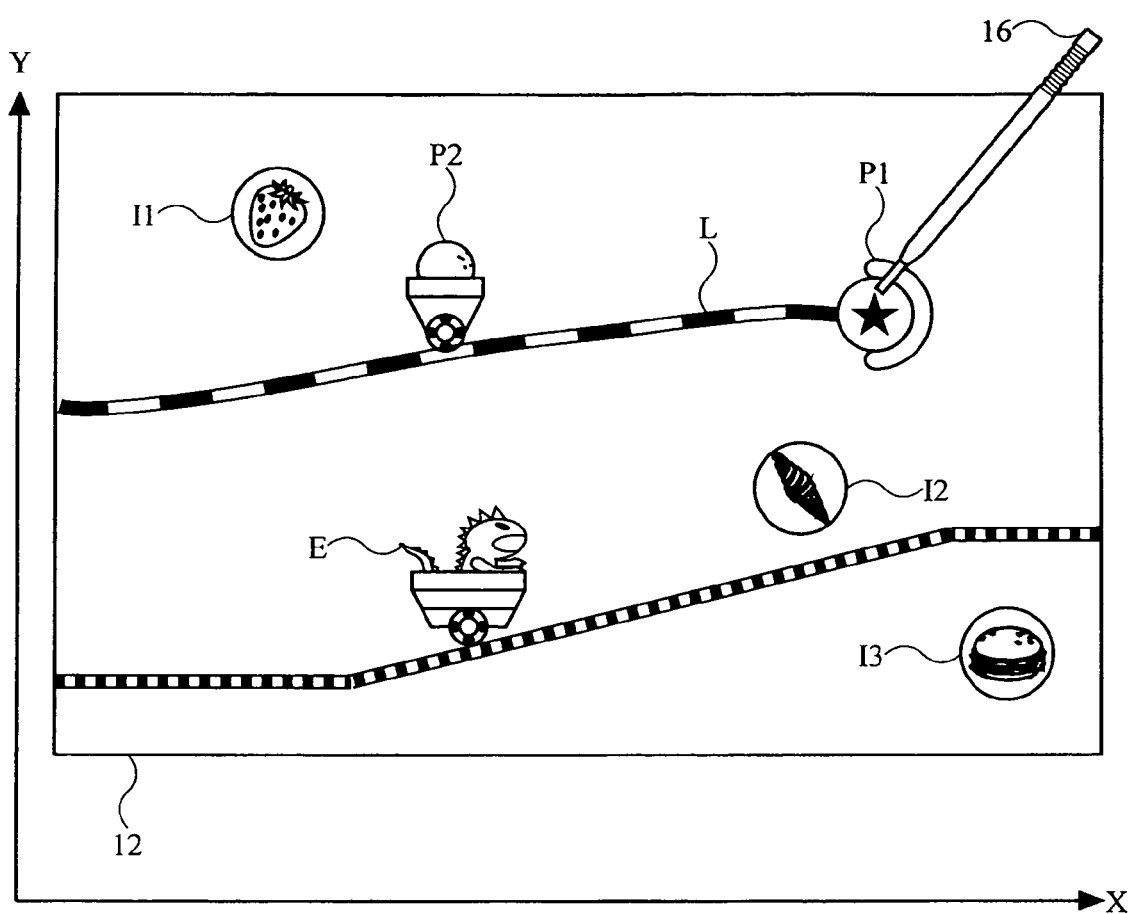

STORAGE MEDIUM HAVING GAME PROGRAM STORED THEREON AND GAME APPARATUS

CROSS REFERENCE TO RELATED APPLICATION

The disclosure of Japanese Patent Application No. 2005-071079 is incorporated herein by reference.

TECHNICAL FIELD

Certain exemplary illustrative embodiments relate to a storage medium having a game program stored thereon and a game apparatus, and, more particularly, to a storage medium having stored thereon a game program usable in a computer capable of accepting a touch input and outputting coordinate information in a predetermined coordinate system and a game apparatus capable of accepting a touch input.

BACKGROUND AND SUMMARY

Conventionally, game apparatuses with which a player can enjoy a game by operating a character (player character) displayed on a game screen have been widely used. For example, some game apparatuses display a touch panel on a display screen for the player to operate a player character. As disclosed by, for example, Japanese Laid-Open Publication No. 2002-939 (hereinafter, referred to as "patent document 1"), the player causes a player character appearing in a game image to perform a motion by touch-operating the touch panel when necessary. Patent document 1 discloses, for example, a game with which the player touches and drags a PUSH button displayed as a game image on a touch panel to cause a player character to perform a golf swing, and a game with which the player touches a player character to cause the player character to jump. In these games, the player touches a game image via the touch panel when necessary, so that the player character performs a motion in accordance with the touched position.

According to patent document 1, only when a touch operation is performed, the game is controlled to reflect the touch operation. Namely, the player needs to perform a touch operation when wishing to control the game as he/she desires. When the player discontinues the touch operation, the game control is also discontinued.

Game apparatuses with which the player can enjoy a game by operating a player character displayed on a game screen by touch-operating the touch panel continuously for a long time, instead of when necessary, are conceivable. However, such game apparatuses have perceivable problems. One conceivable game can be played as follows. The player touches positions in a game space. A locus of points which correspond to the touched positions is created in the game space. Along the locus, another object is moved. In this game, the object moves along the locus drawn by the player in the game space. Therefore, when the locus is discontinued, the game cannot be continued.

However, the player tends to discontinue the touch operation of the touch panel (i.e., take off his/her finger or a stick from the touch panel) in order to see the game image displayed on a display screen covered with the touch panel. If the game is continuously controlled to reflect the touch operation made so far even while the touch operation is in a paused state, the player can enjoy the convenience of being able to discontinue the touch operation in accordance with the situation.

Especially in the above-described game which requires the player to continuously touch-operate the touch panel, the locus created in the game space is discontinued when the player discontinues the touch operation. In such a case, it becomes difficult to continue the game as described above. For example, when the game image is displayed by scrolling the screen at high speed in one direction, the object immediately reaches the position at which the locus is discontinued. Therefore, the game cannot be continued when the touch-operation is paused even for a short time. The games disclosed by patent document 1 are not based on the precondition that the touch panel is continuously touch-operated for a long time. Therefore, patent document 1 does not disclose any technology for solving the above-described problems.

Therefore, a feature of certain exemplary illustrative embodiments is to provide a storage medium having stored thereon a game program for allowing a game to be controlled to reflect the touch operation made so far even when the touch operation is discontinued, and a game apparatus for executing such a game program. Another feature of certain exemplary illustrative embodiments is to provide a storage medium having stored thereon a game program for allowing a game, which is based on a precondition that a touch panel is continuously touch-operated for a long time, to be continued even when the touch operation is discontinued, and a game apparatus for executing such a game program.

Certain exemplary illustrative embodiments have the following aspects to attain the features mentioned above. The reference numerals, the numbers of the steps (the term "step" is referred to simply as "S" and provided with the respective numerals) executed by the computer, and the like in parentheses in this section of the specification indicate the correspondence with the embodiments described later for easier understanding of the exemplary illustrative embodiments and do not limit the present invention in any way.

A first aspect of certain exemplary illustrative embodiments is directed to a storage medium having stored thereon a game program executable by a computer (21) of a game apparatus (1) for displaying, on a display screen (12), a game image representing at least a part of a virtual space in which a first object (P1) and a second object (P2) are present, the game apparatus including touch coordinate pair input means (15) for outputting coordinate information based on a predetermined coordinate system in accordance with a touch operation performed by a player. The game program causes the computer to execute a position data storage step (the first player object coordinate pair DC3 and the second player object coordinate pair DC5 stored on the RAM 24), a display control step (S60), a detection step (S51, S61), a first object position update step (S54 to S56), and a second object position update step (S59). The position data storage step stores, on a memory (24), first object position data (DC3) representing a position of the first object in the virtual space and second object position data (DC5) representing a position of the second object in the virtual space. The display control step displays the first object and the second object on the display screen based on the first object position data and the second object position data stored on the memory. The detection step detects an input coordinate pair (DC1) which is input by the touch coordinate pair input means. The first object position update step, while input coordinate pairs are being detected by the detection step, updates the first object position data stored on the memory based on the input coordinate pairs (S56). The second object position update step updates the second object position data, based on the first object position data stored on the memory.

In a second aspect based on the first aspect, the game program further causes the computer to execute a first object position automatic update step (S57). The first object position automatic update step further automatically updates the first object position data stored on the memory, based on a predetermined rule (movement in the X direction).

In a third aspect based on the second aspect, the game program further causes the computer to execute a display area setting data storage step (S60) and a display area update step (S60). The game apparatus displays the game image representing a part of the virtual space on the display screen. The display area setting data storage step stores, on the memory, display area setting data (DC6) for setting a display area of the virtual space to be displayed on the display screen. The display area update step automatically updates the display area setting data stored on the memory, in accordance with the update of the first object position data by the first object position automatic update step. The display control step executed by the computer displays a part of the virtual space on the display screen based on the display area setting data stored on the memory.

In a fourth aspect based on the first aspect, the game program further causes the computer to execute a locus data storage step (S58). The locus data storage step stores, on the memory, locus data (DC4) of the first object in the virtual space based on the first object position data stored on the memory. The second object position update step executed by the computer updates the second object position data based on the locus data stored on the memory by the locus data storage step.

In a fifth aspect based on the fourth aspect, the second object position update step executed by the computer updates the second object position data, such that the second object moves on a locus (L) based on the locus data stored on the memory by the locus data storage step.

In a sixth aspect based on the first aspect, the game program further causes the computer to execute a target position data storage step (S54, S55). The target position data storage step stores position data in the virtual space corresponding to the input coordinate pair detected by the detection step, the position data being stored on the memory as target position data (DC2), and when a new input coordinate pair is later detected by the detection step, updates the target position data into position data in the virtual space corresponding to the new input coordinate pair. The first object position update step executed by the computer gradually updates the first object position data such that the first object position data gradually approaches the target position data.

In a seventh aspect based on the sixth aspect, the display control step executed by the computer displays a third object (P1t) on the display screen based on the target position data stored on the memory.

In an eighth aspect based on the first aspect, the game program further causes the computer to execute an area determination step (S52). The area determination step determines whether or not the input coordinate pair detected by the detection step is within a predetermined first area (A1) of the display screen. The first object position update step executed by the computer updates the first object position data stored on the memory based on the input coordinate pair when the input coordinate pair is determined to be within the predetermined first area by the area determination step.

In a ninth aspect based on the eighth aspect, while the detection of input coordinate pairs by the detection step is continued after the input coordinate pair at the start of input is determined to be within the predetermined first area by the area determination step, the first object position update step executed by the computer updates the first object position data stored on the memory based on the input coordinate pairs.

In a tenth aspect based on the eighth aspect, the first predetermined area is an area expanding to a predetermined degree around a position at which the first object is displayed on the display screen based on the first object position data.

In an eleventh aspect based on the eighth aspect, the game program further causes the computer to execute a fourth object position data storage step, a determination step, and a fourth object-related processing step (S63). The fourth object position data storage step stores, on the memory, fourth object position data (DC7) representing a position of a fourth object (I) in the virtual space. The display control step executed by the computer displays the fourth object on the display screen based on the fourth object position data stored on the memory. The determination step, when the input coordinate pair is determined to be outside the predetermined first area by the area determination step, determines whether or not the input coordinate pair matches a display position of the fourth object. The fourth object-related processing step executes predetermined processing related to the fourth object when the input coordinate pair is determined to match the display position of the fourth object by the determination step.

In a twelfth aspect based on the second aspect, the game program further causes the computer to execute a restriction step (S53, S55). The first object position automatic update step executed by the computer updates the first object position data, such that the position of the first object on the display screen based on the first object position data stored on the memory moves in a specified direction (X direction). The restriction step restricts a post-update value of the first object position data, such that a display position of the first object on the display screen based on the first object position data after the update by the first object position update step and the first object position automatic update step is restricted within a second predetermined area (A2) of the display screen. The second predetermined area does not include a position on the display screen corresponding to an initial value of the second object position data and is set in the specified direction with respect to the position corresponding to the initial value. The second object position update step executed by the computer controls the second object position data, such that a position on the display screen corresponding to the second object position data is outside the second predetermined area.

A thirteenth aspect of certain exemplary illustrative embodiments is directed to a storage medium having stored thereon a game program executable by a computer of a game apparatus for displaying, on a display screen, a game image representing at least a part of a virtual space in which a first object (P2) is present, the game apparatus including touch coordinate pair input means for outputting coordinate information based on a predetermined coordinate system in accordance with a touch operation performed by a player. The game program causes the computer to execute a first object position data storage step, a first object display step, an indication position data storage step, a detection step, an indication position data update step, and a first object position update step. The first object position data storage step stores first object position data for determining a display position of the first object on the display screen. The first object display step displays the first object on the display screen based on the first object position data stored on the memory. The indication position data storage step stores indication position data representing an indication position on the display screen. The detection step detects an input coordinate pair which is input by the touch coordinate pair input means. The indication position data update step, when an input coordinate pair is detected by the detection step, updates the indication position data stored on the memory based on the input coordinate pair. The first object position update step updates the first object position data based on the indication position data stored on the memory, regardless of whether input coordinate pairs are being detected by the detection step or not.

In a fourteenth aspect based on the thirteenth aspect, the game program further causes the computer to execute a second object display step. The second object display step displays a second object at the indication position based on the indication position data stored on the memory.

In a fifteenth aspect based on the thirteenth aspect, the game program further causes the computer to execute an indication mark display step. The indication mark display step displays an indication mark at a coordinate pair position on the display screen corresponding to the indication position based on the indication position data stored on the memory.

A sixteenth aspect of certain exemplary illustrative embodiments is directed to a game apparatus for displaying, on a display screen, a game image representing at least a part of a virtual space in which a first object and a second object are present, the game apparatus being operable by touch coordinate pair input means for outputting coordinate information based on a predetermined coordinate system in accordance with a touch operation performed by a player. The game apparatus comprises storage means, position data storage control means, display control means, detection means, first object position update means, and second object position update means. The position data storage control means stores, on the storage means, first object position data representing a position of the first object in the virtual space and second object position data representing a position of the second object in the virtual space. The display control means displays the first object and the second object on the display screen based on the first object position data and the second object position data stored on the storage means. The detection means detects an input coordinate pair which is input by the touch coordinate pair input means and stores the input coordinate pair on the storage means. The first object position update means updates the first object position data stored on the storage means, based on the input coordinate pair stored on the storage means, regardless of whether input coordinate pairs are being detected by the detection means or not. The second object position update means updates the second object position data based on the first object position data stored on the storage means.

A seventeenth aspect of certain exemplary illustrative embodiments is directed to a game apparatus for displaying, on a display screen, a game image representing at least a part of a virtual space in which a first object is present, the game apparatus being operable by touch coordinate pair input means for outputting coordinate information based on a predetermined coordinate system in accordance with a touch operation performed by a player. The game apparatus comprises storage means, first object position data storage control means, first object display control means, indication position data storage control means, detection means, indication position data update means, and first object position update means. The first object position data storage control means stores, on the storage means, first object position data for determining a display position of the first object on the display screen. The first object display control means displays the first object on the display screen based on the first object position data stored on the storage means. The indication position data storage control means stores indication position data representing an indication position on the display screen.

The detection means detects an input coordinate pair which is input by the touch coordinate pair input means. The indication position data update means, when an input coordinate pair is detected by the detection means, updates the indication position data stored on the storage means based on the input coordinate pair. The first object position update means updates the first object position data based on the indication position data stored on the storage means, regardless of whether input coordinate pairs are being detected by the detection means or not.

According to the first aspect of certain exemplary illustrative embodiments, even when the touch operation of the touch coordinate pair input means is discontinued, the second object performs a motion based on the position of the first object and therefore the game can be continued. Especially, for example, a game, based on a precondition that the touch operation is continuously performed, can be continued even if the touch operation is discontinued.

According to a second aspect of certain exemplary illustrative embodiments, the first object automatically performs a motion based on a predetermined rule. Therefore, even if the touch operation is discontinued, the first object can automatically perform a motion to continue the game.

According to the third aspect of certain exemplary illustrative embodiments, even if the touch operation is discontinued in a game in which the game images are changed one after another by the screen being scrolled based on a predetermined rule, the game can be continued.

According to the fourth and fifth aspects of certain exemplary illustrative embodiments, a game in which the movement of the first object is controlled by the touch operation performed by the player and the second object is moved based on, or along, the locus of the first object, can be continued even if the touch operation is discontinued.

According to the sixth aspect of certain exemplary illustrative embodiments, a game in which the first object is guided to approach an input coordinate pair which is input by the touch operation performed by the player is realized. The first object is not guided in sensitive response to the input coordinate pair, and a certain limitation is provided on the response velocity of the first object. Since the first object cannot be guided completely as intended by the player, the player is provided with a fun of guiding the first object.

According to the seventh aspect of certain exemplary illustrative embodiments, the position at which the first object is to guided is displayed as the third object. Therefore, the player can easily grasp the future movement of the first object.

According to the eighth and ninth aspects of certain exemplary illustrative embodiments, once a position in a predetermined range is touched, the first object can be moved by the subsequent continuous touch operation. Therefore, an operation of easily moving the first object can be realized.

According to the tenth aspect of certain exemplary illustrative embodiments, once a position in a predetermined range having the first object as the center thereof is touched, the first object can be moved by the subsequent continuous touch operation. Therefore, an operation of moving the first object in accordance with the feeling of the player can be realized.

According to the eleventh aspect of certain exemplary illustrative embodiments, an operation different from the operation of moving the first object or the second object can be easily realized. Even during such an operation, the first object and the second object can be continuously moved.

According to the twelfth aspect of certain exemplary illustrative embodiments, the range in which the player can guide the first object using the touch panel is restricted. Therefore, the main moving direction of the first object and the second object can be set to one direction.

According to the thirteenth aspect of certain exemplary illustrative embodiments, even if the touch operation is discontinued in a game in which the first object is moved based on the position thereof on the display screen, the first object performs a motion based on the stored input coordinate pair. Therefore, the game can be continued. Accordingly, a game, based on a precondition that the touch operation is continuously performed, can be continued even if the touch operation is discontinued.

According to the fourteenth or fifteenth aspect of certain exemplary illustrative embodiments, the second object or the indication mark is displayed at the indication position on the display screen. Therefore, the position indicated by the player can be made clear.

The game apparatus according to certain exemplary illustrative embodiments provides substantially the same effects as those of the storage medium having the above-described game program stored thereon.

These and other features, aspects, and advantages of certain exemplary illustrative embodiments will become more apparent from the following detailed description when taken in conjunction with the accompanying drawings.

BRIEF DESCRIPTION OF THE DRAWINGS

FIG. 3 shows an exemplary display of a game image on a second LCD 12;

DETAILED DESCRIPTION

Figure 1:
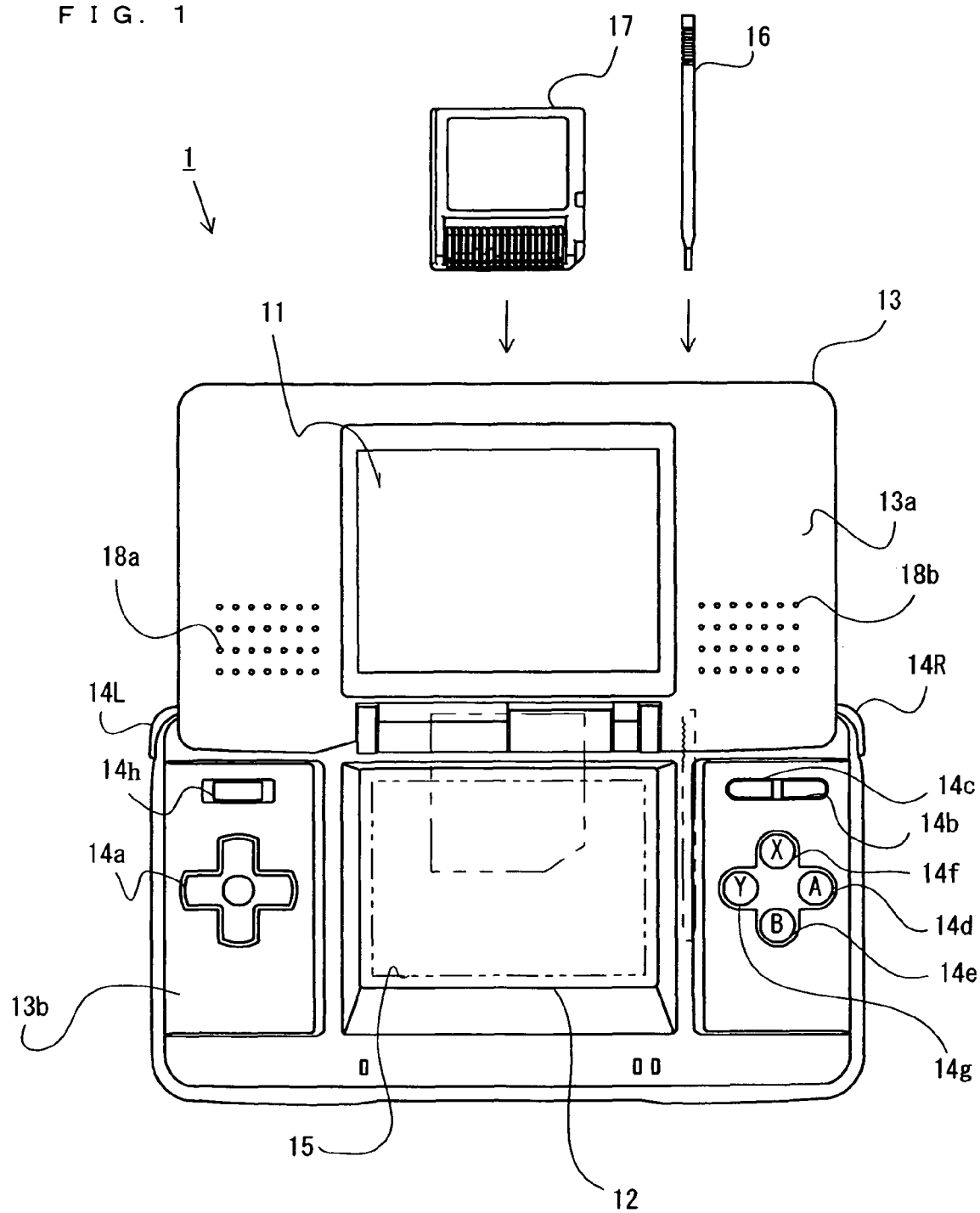
FIG. 1 is an external view of a game apparatus 1 for executing a game program according to certain exemplary illustrative embodiments.

Hereinafter, a game apparatus for executing a game program according to one exemplary illustrative embodiment will be described by way of the drawings. FIG. 1 is an external view of a game apparatus 1 for executing a game program according to certain exemplary illustrative embodiments. Herein, a mobile game apparatus will be described as one example of the game apparatus 1.

As shown in FIG. 1, the game apparatus 1 includes a first LCD (Liquid Crystal Display) 11 and a second LCD 12. A housing 13 includes an upper housing 13a and a lower housing 13b. The first LCD 11 is accommodated in the upper housing 13a, and the second LCD 12 is accommodated in the lower housing 13b. The first LCD 11 and the second LCD 12 both have a resolution of 256 dots×192 dots. In this exemplary illustrative embodiment, LCDs are used as display devices, but apparatuses of certain exemplary illustrative embodiments may use any other display devices such as EL (Electro Luminescence) devices or the like. The display devices may have any resolution.

The upper housing 13a has speaker holes 18a and 18b for releasing a sound from a pair of speakers (represented with reference numerals 30a and 30b in FIG. 2) described later.

The lower housing 13b has a cross-shaped switch 14a, a start switch 14b, a select switch 14c, an A button 14d, a B button 14e, an X button 14f, a Y button 14g, a power button 14h, an L button 14L and an R button 14R provided thereon as input elements. A touch panel 15 is provided on a screen of the second LCD 12 as an additional input element. The lower housing 13b has insertion holes for accommodating a memory card 17 and a stick 16.

The touch panel 15 may be of any system; for example, a resistance film system, an optical (infrared) system, or a static capacitance coupling system. The touch panel 15 is one exemplary pointing device having a function of, when a surface thereof is touched with the stick 16, outputting coordinate data corresponding to the position of the surface touched by the stick 16. Hereinafter, it is assumed that a player operates the touch panel 15 using the stick 16. Alternatively, the player may operate the touch panel 15 using a pen (stylus pen) or his/her finger instead of the stick 16. In this exemplary illustrative embodiment, the touch panel 15 has a resolution (detection precision) of 256 dots×192 dots like the second LCD 12. It is not absolutely necessary that the touch panel 15 has the same resolution as that of the second LCD 12.

The memory card 17 is a storage medium having a game program, game images and the like stored thereon, and is detachably inserted into the insertion hole of the lower housing 13b.

Figure 2:
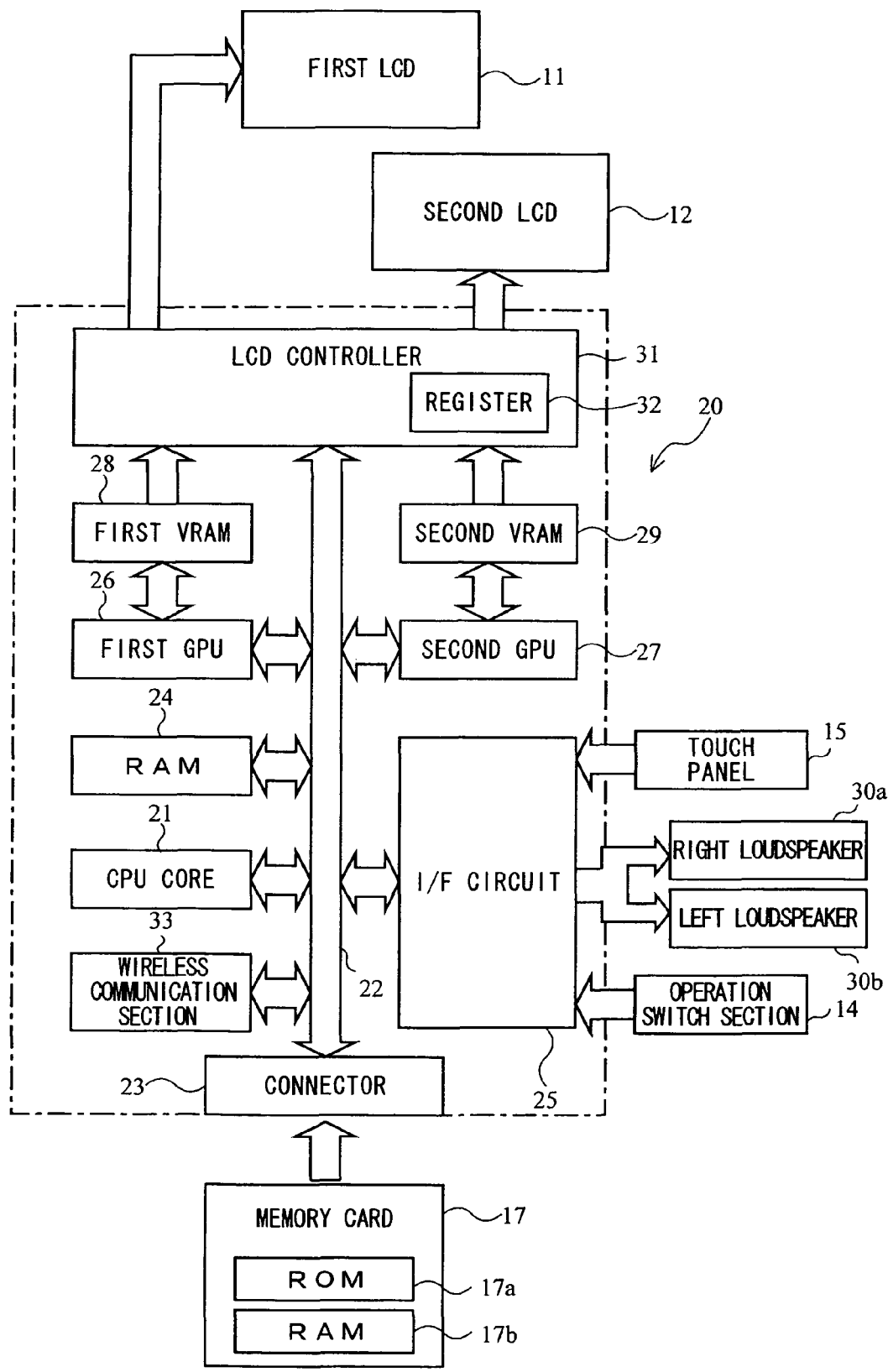
FIG. 2 is a block diagram illustrating an internal structure of the game apparatus 1 in FIG. 1.

Next, with reference to FIG. 2, an internal structure of the game apparatus 1 will be described. FIG. 2 is a block diagram illustrating an internal structure of the game apparatus 1.

In FIG. 2, a CPU core 21 is mounted on an electronic circuit board 20 accommodated in the housing 13. The CPU core 21 is connected to a connector 23 via a bus 22 and is also connected to an input/output interface circuit (represented as "I/F circuit" in FIG. 2) 25, a first GPU (Graphics Processing Unit) 26, a second GPU 27, a RAM 24 and an LCD controller 31. The memory card 17 is detachably connected to the connector 23. The memory card 17 includes a ROM 17a having a game program, game images and the like stored thereon and a RAM 17b having backup data rewritably stored thereon. The game program stored on the ROM 17a of the memory card 17 is loaded onto the RAM 24, and the game program loaded onto the RAM 24 is executed by the CPU core 21. The RAM 24 stores temporary data obtained by the execution of the game program by the CPU core 21, data for creating game images and the like, as well as the game program. The I/F circuit 25 is connected to the touch panel 15, a right speaker 30a, a left speaker 30b, and an operation switch section 14 including the cross switch 14a, the A button 14d and the like shown in FIG. 1. The right speaker 30a and the left speaker 30b are respectively located inside the speaker holes 18a and 18b.

The first GPU 26 is connected to a first VRAM (Video RAM) 28, and the second GPU 27 is connected to a second VRAM 29. In response to an instruction from the CPU core 21, the first GPU 26 creates a first game image based on the data for creating a game image stored on the RAM 24, and draws the first game image in the first VRAM 28. Similarly, in response to an instruction from the CPU core 21, the second GPU 27 creates a second game image and draws the second game image in the second VRAM 29. The first VRAM 28 and the second VRAM 29 are connected to the LCD controller 31.

The LCD controller 31 includes a register 32. The register 32 stores the value of "0" or "1" in accordance with an instruction from the CPU core 21. When the value in the register 32 is "0", the LCD controller 31 outputs the first game image drawn in the first VRAM 28 to the first LCD 11, and outputs the second game image drawn in the second VRAM 29 to the second LCD 12. When the value in the register 32 is "1", the LCD controller 31 outputs the first game image drawn in the first VRAM 28 to the second LCD 12, and outputs the second game image drawn in the second VRAM 29 to the first LCD 11.

A game program according to certain exemplary illustrative embodiments can be executed by any computer system which can display images on at least one display device. The game program may be supplied to such a computer system or a game apparatus via an external memory medium such as the memory card 17 or the like, or via a wired or wireless communication line. The game program may be pre-stored in a non-volatile memory device in a computer system or a game apparatus. The information storage medium for storing the game program may be any of a CD-ROM, a DVD or other types of optical disc-shaped storage medium instead of the non-volatile memory device.

Figure 4:
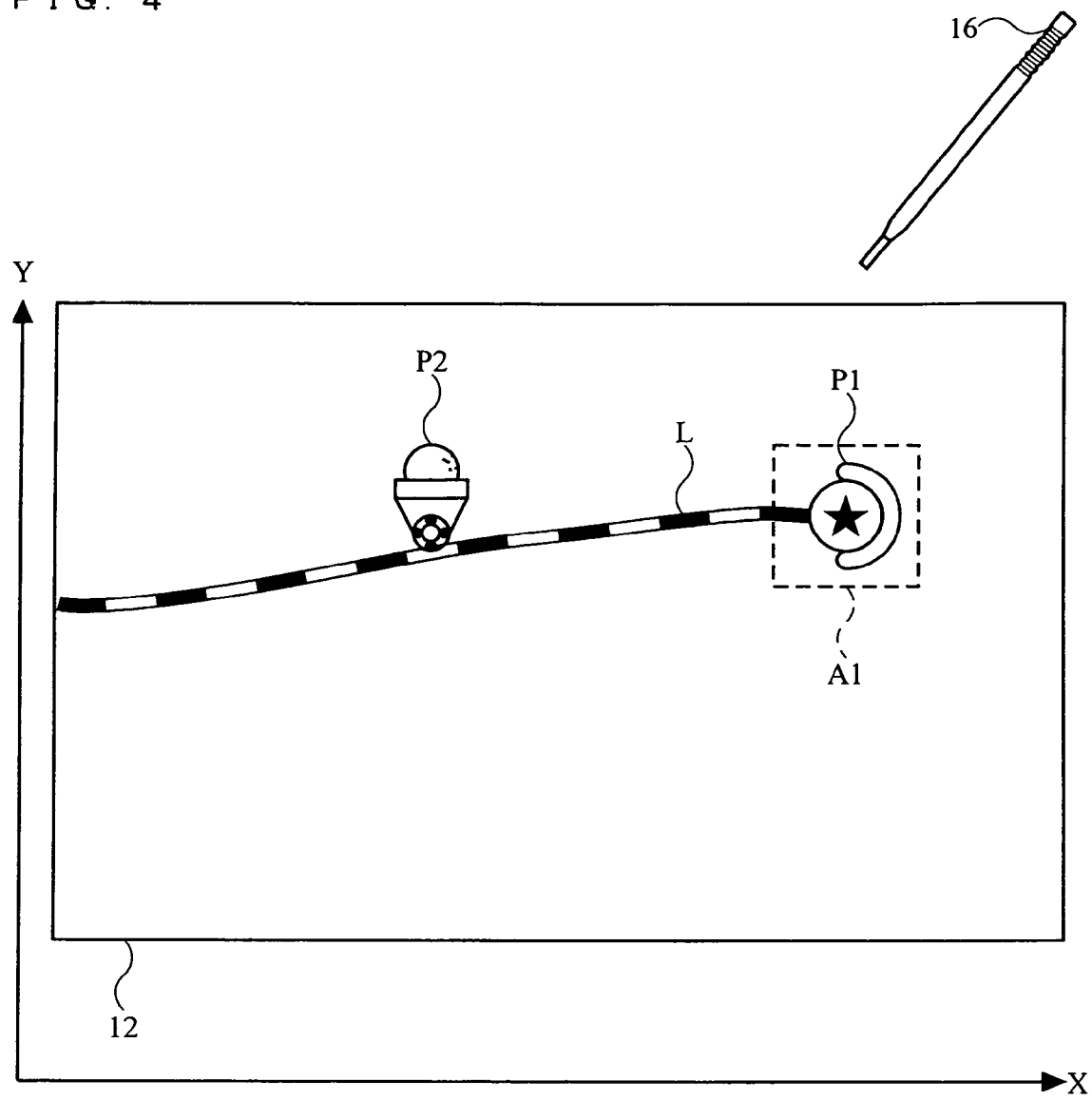
FIG. 4 shows an exemplary display of a guidance mode range A1 which is set for a first player object P1 on the second LCD 12.
Figure 5:
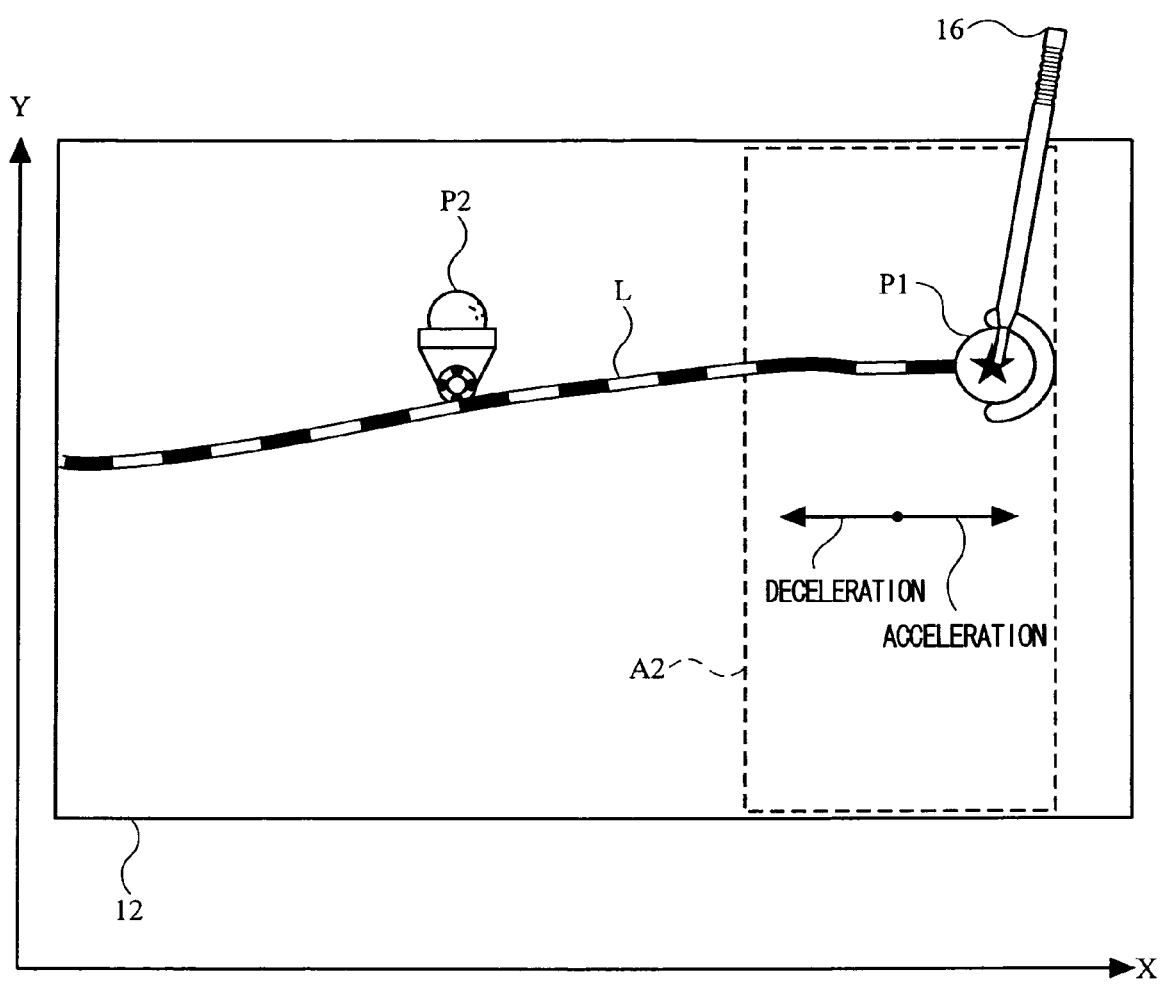
FIG. 5 shows an exemplary display of a first player object P1 moving in accordance with a touch operation of a touch panel 15 and a guidance display range A2.
Figure 6:
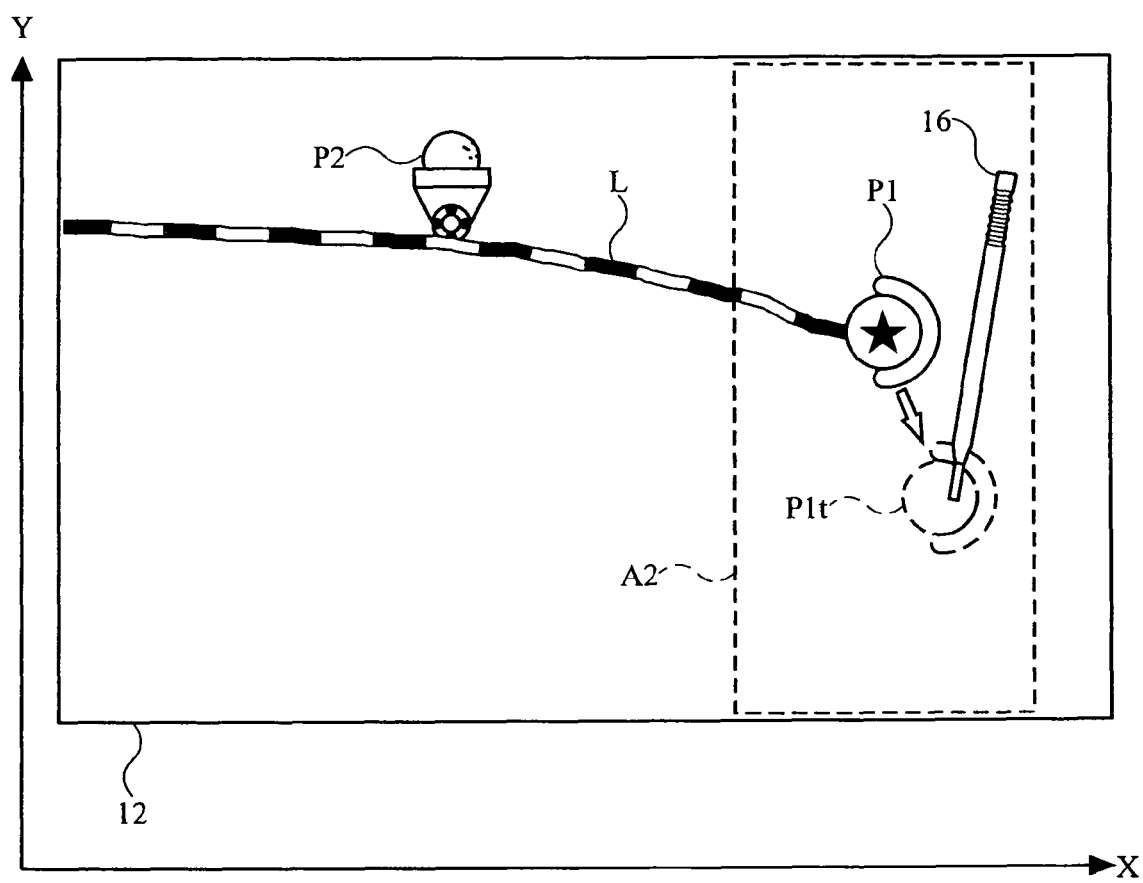
FIG. 6 shows an exemplary display of a target object P1t.
Figure 7:
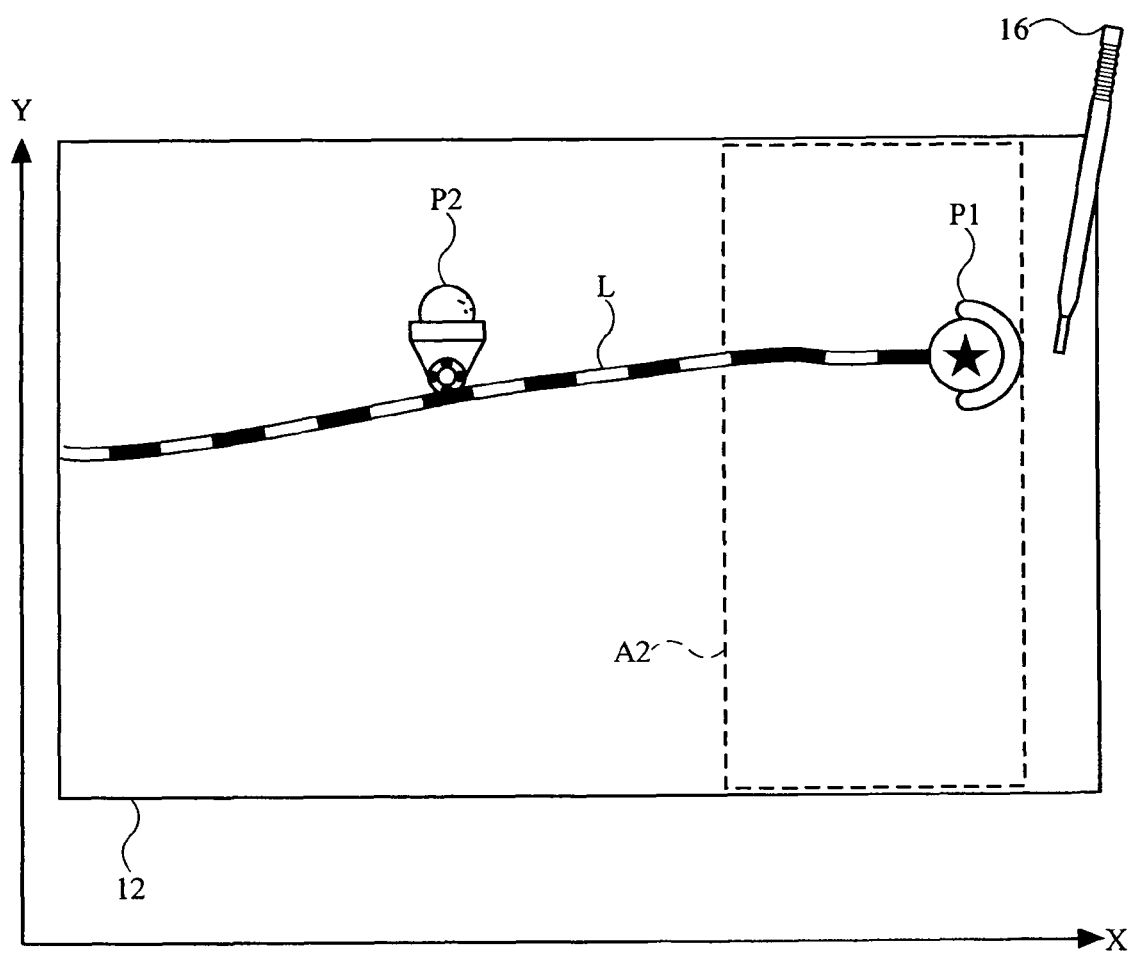
FIG. 7 shows an exemplary display of a motion of the first player object P1 when a position outside the guidance display range A2 is touch-operated in a guidance mode.
Figure 8:
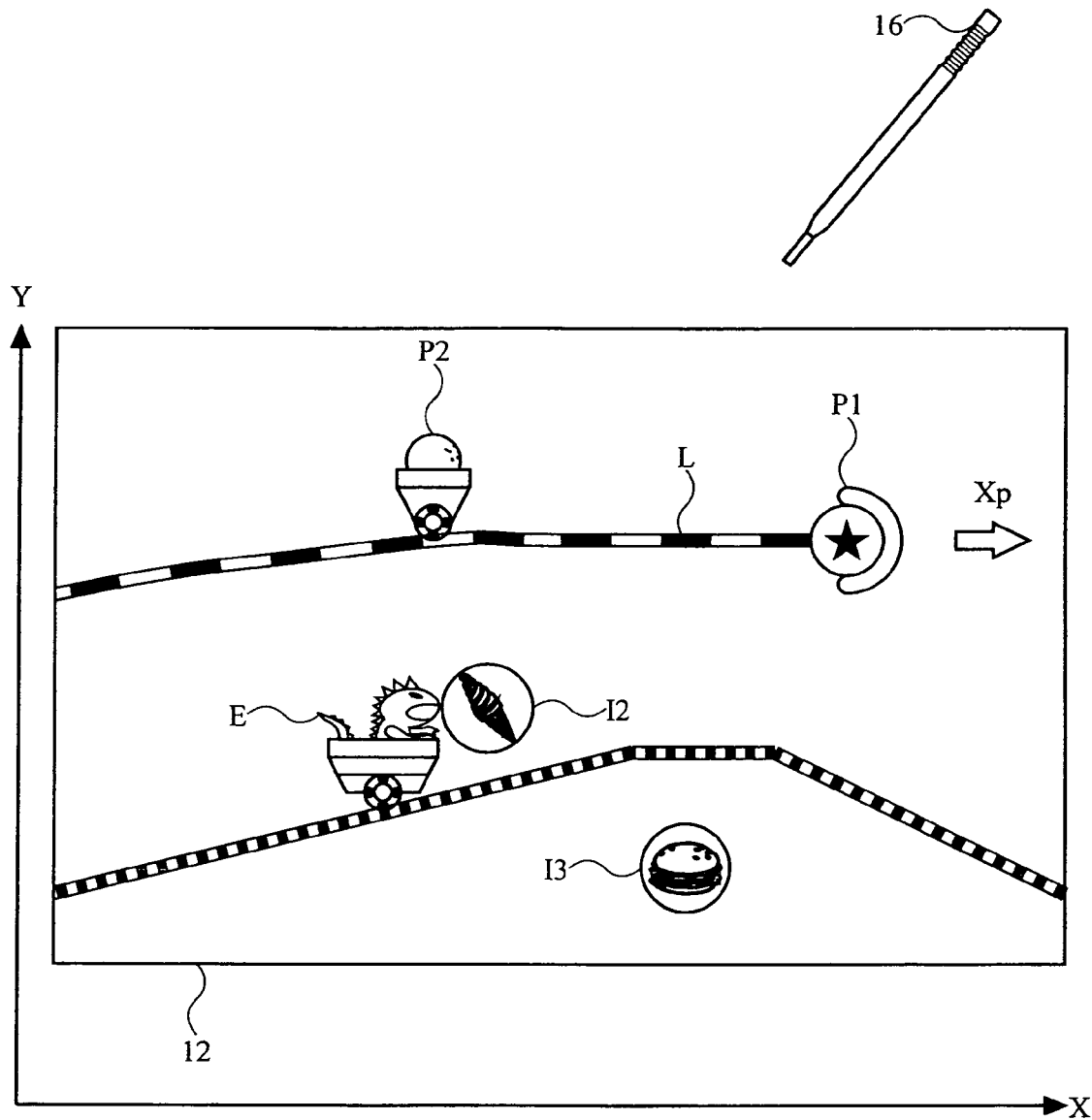
FIG. 8 shows an exemplary display of a motion of the first player object P1 when the touch panel 15 is not touch-operated.

Before describing a specific processing operation executed by the game program with the game apparatus 1, exemplary game images displayed on the second LCD 12 by such a processing operation will be described with reference to FIG. 3 through FIG. 8. FIG. 3 shows an exemplary display of a game image on the second LCD 12. FIG. 4 shows an exemplary display of a guidance mode range A1 which is set for the first player object P1 on the second LCD 12. FIG. 5 shows an exemplary display of the first player object P1 moving in accordance with a touch operation of the touch panel 15 and a guidance display range A2. FIG. 6 shows an exemplary display of a target object P1t. FIG. 7 shows an exemplary display of a motion of the first player object P1 when a position outside the guidance display range A2 is touch-operated in a guidance mode. FIG. 8 shows an exemplary display of a motion of the first player object P1 when the touch panel 15 is not touch-operated. When the game program according to certain exemplary illustrative embodiments is executed with the game apparatus 1, a game image including a game score and the like is displayed on the first LCD 11, but this is not a feature of the certain exemplary illustrative embodiments and will not be described in detail or shown in any figure.

As shown in FIG. 3, the game image displayed on the second LCD 12 includes a first player object P1, a second player object P2, a locus object L, an enemy object E, items I and the like. The images of these elements are displayed on the second LCD 12 with a predetermined background. The predetermined background is omitted from FIG. 3 through FIG. 8.

The first player object P1 is an object moving in an X direction in FIG. 3 (rightward) in the game space as a main moving direction. The moving direction of the first player object P1 is controllable in a predetermined range by a touch operation of the touch panel 15 performed by the player. A locus of the movement of the first player object P1 in the game space is drawn as a locus object L. The second player object P2 moves along the locus object L in the game space while following the first player object P1 with a predetermined distance being kept from the first player object P1. Namely, the main moving direction of the first player object P1 is the X direction and the locus object L is also drawn so as to extend in the X direction. Accordingly, a main moving direction of the second player object P2 is also the X direction. The player cannot directly control the movement of the second player object P2 by touch-operating the touch panel 15. The player indirectly controls the movement of the second player object P2 by controlling the position to which the first player object P1 is to move and thus adjusting the position at which the locus object L is drawn.

The enemy object E moves so as to run in parallel to the second player object P2 in the game space. Typically, the enemy object E acts to obstruct the movement of the second player object P2 in the game space. In the game space, the items I are located. In FIG. 3, three items I1 through I3 are shown. Each item I can be obtained when the player touch-operates a position of the touch panel 15 at which the item is displayed in a non-guidance mode. In accordance with the type of the item I obtained, special motions are made possible; for example, the moving velocity of the first player object P1 and the second player object P2 in the X direction is accelerated.

The screen of the second LCD 12 is scrolled in the X direction of the game space to display a game image including both the first player object P1 and the second player object P2. For example, the screen is scrolled such that the central position in the X direction of the game image displayed on the second LCD 12 is the position in the X direction of the second player object P2 or a position in the X direction between the first player object P1 and the second player object P2. Therefore, the scrolling for creating a game image to be displayed on the second LCD 12 is performed in the X direction of the game space, and the scrolling velocity is adjusted in accordance with the moving velocity at which the first player object P1 and the second player object P2 move in the X direction of the game space. The first player object P1, the second player object P2 and a part of the locus object L are constantly included in the game image displayed on the second LCD 12.

As described above, the second LCD 12 is covered with the touch panel 15, and the player proceeds with the game mainly by operating the touch panel 15. When the player touch-operates the touch panel 15, the touch panel 15 outputs a touch input coordinate pair corresponding to the touched position to the CPU core 21. The CPU core 21 converts the touch input coordinate pair which is output from the touch panel 15 into a coordinate pair of the touched position in the game space (world coordinate pair) displayed on the second LCD 12. Namely, the player can directly designate a position based on a world coordinate system of the game space by touch-operating the touch panel 15. As described above, the game image displayed on the second LCD 12 is obtained by scrolling the screen in the X direction of the game space. Accordingly, the position in the game space which is designated by the touch operation of the touch panel 15 by the player automatically moves in the X direction as the screen is scrolled even if the player touch-operates the same position.

As shown in FIG. 4, a predetermined guidance mode range A1 having the first player object P1 as the center there of is provided. When the player initially touches the touch panel 15 with the stick 16, his/her finger or the like (touch-on), the player can touch a position in the guidance mode range A1.

Then, the game is put into a guidance mode in which the moving direction of the first player object P1 is guided. Namely, when wishing to guide the moving direction of the first player object P1, the player merely needs to touch-on the first player object P1. Thus, the moving direction of the first player object P1 can be controlled.

As shown in FIG. 5, a guidance display range A2 is provided in a right area of the game image displayed on the second LCD 12. The guidance display range A2 represents an area in which the player can guide the first player object P1 in the guidance mode. The player can move the first player object P1 in the guide display range A2. By an operation of touching-on the first player object P1 in the guide mode range A1 and sliding the first player object P1 on the touch panel 15 (a drag-like operation), the moving direction of the first player object P1 in the X direction and a Y direction perpendicular to the X direction is controlled. Specifically, the first player object P1 moves in the game space toward a world coordinate pair corresponding to a touch input coordinate pair obtained by the touch operation (target coordinate pair). Namely, when the player touch-operates the touch panel 15 in the guide display range A2, the first player object P1 is guided toward the position in the game space corresponding to the touched position.

As shown in FIG. 5, when the player guides the first player object P1 in the X direction (rightward) in the guide display range A2, the velocity at which the second player object P2 moves in the game space along the locus object L is accelerated. By contrast, when the player guides the first player object P1 in a direction opposite to the X direction (leftward) in the guide display range A2, the velocity at which the second player object P2 moves in the game space along the locus object L is decelerated. Namely, the moving velocity of the second player object P2 can be controlled by the position in the X direction in the guidance display range A2 to which the player guides the first player object P1 on the touch panel 15. As described above, the second player object P2 moves in the game space along the locus object L with a predetermined distance being kept from the first player object P1. As a result, the moving velocity of the first player object P1 can also be controlled by the position in the X direction in the guidance display range A2 to which the player guides the first player object P1 on the touch panel 15.

There is a certain limit on the velocity at which the first player object P1 moves toward the target coordinate pair corresponding to the touch input coordinate pair. More specifically, when the player touch-operates the touch panel 15 so as to guide the first player object P1 at a velocity higher than the limit, the world coordinate pair at which the first player object P1 is located is temporarily set at a different position from the target coordinate pair. At this point, as shown in FIG. 6, a target object P1t is displayed in the game image in accordance with the target coordinate pair. For example, the target object P1t is represented as a semi-transparent image of the first player object P1, such that the player intuitively perceives that the target object P1t indicates the position to which the first player object P1 is to move.

As shown in FIG. 7, when the player touch-operates the touch panel 15 to a position outside the guidance display range A2 in the guidance mode, the touch input coordinate pair is converted into a world coordinate pair of the touched position in the game space displayed on the second LCD 12. The world coordinate pair is given by setting the Y direction coordinate at same value as that of the touch input coordinate pair and setting the X direction coordinate at a value closest to the touch input coordinate pair within the guidance display range A2. Namely, the first player object P1 is guided to, as the target coordinate pair, a position in the guidance display range A2 which is closest to the touched position of the touch panel 15. In this manner, a game in which the player guides the first player object P1 and the second player object P2 by continuously touch-operating the touch panel 15 is realized.

As shown in FIG. 8, when the player takes off the stick 16, his/her finger or the like from the touch panel 15 (touch-off), or when the game is in the non-guidance mode, the first player object P1 moves in the game space in the X direction (represented with arrow Xp in FIG. 8) in accordance with the moving velocity of the second player object P2. A locus of the first player object P1 moving in the game space in the X direction is created in the game space as a locus object L, and the second player object P2 continues moving in the game space along the locus object L in the X direction. Therefore, even when the player discontinues touch-operating the touch panel 15, the locus object L created in the game space is not discontinued and thus the game can be continued. The first player object P1 and the second player object P2 automatically continue moving in the Xp direction even without the touch operation.

Figure 9:
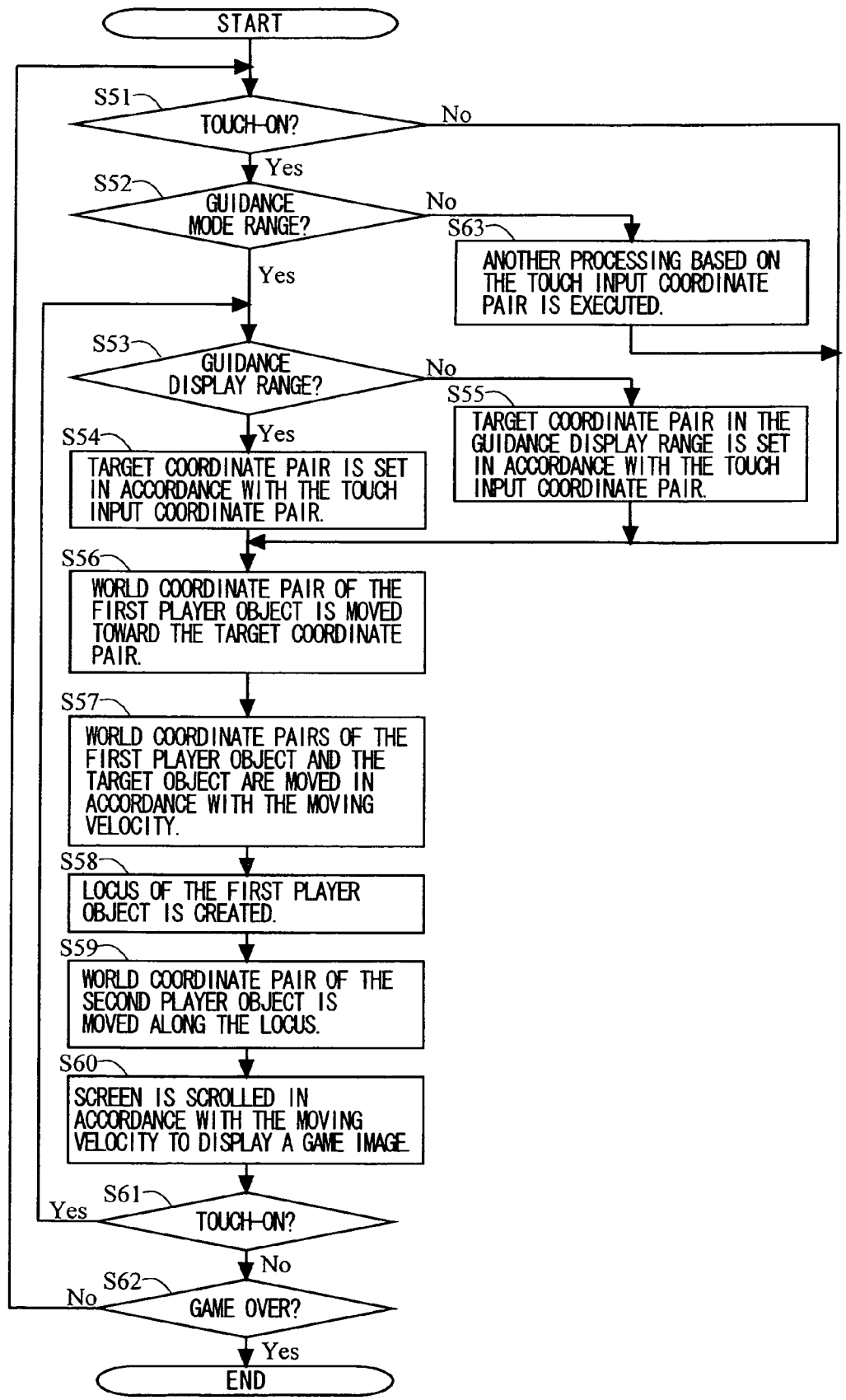
FIG. 9 is a flowchart illustrating a game processing operation performed by the game apparatus 1 by the execution of the game program.
Figure 10:
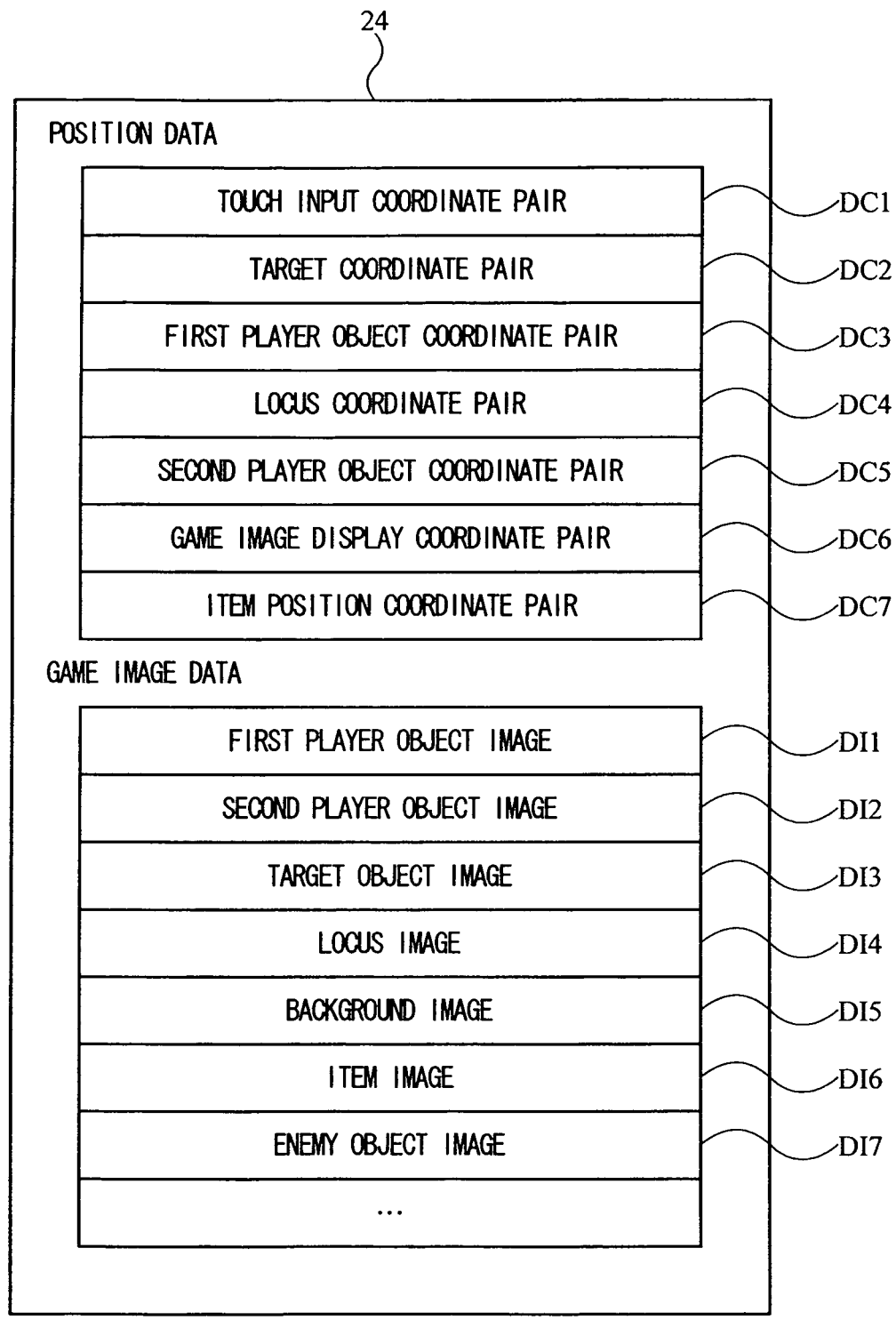
FIG. 10 shows an example of various types of data stored on a RAM 24 by the processing operation executed in accordance with the flowchart in FIG. 9.

With reference to FIG. 9 and FIG. 10, a specific processing operation executed by the game program with the game apparatus 1 will be described. FIG. 9 is a flowchart illustrating a game processing operation performed by the game apparatus 1 by the execution of the game program. FIG. 10 shows an example of various types of data stored on the RAM 24 by the processing operation executed in accordance with the flowchart in FIG. 9. Here, the processing mainly regarding the operations or the like of the first player object P1, the second player object P2 and the locus object L will be described.

When the power of the game apparatus 1 is turned on, the CPU core 21 executes a boot program (not shown). This causes the game program stored on the memory card 17 to be loaded onto the RAM 24. By the execution of the loaded game program by the CPU core 21, the steps shown in FIG. 9 (the term "step" is referred to simply as "S" in FIG. 9) are executed.

As shown in FIG. 9, the CPU core 21 determines whether or not the player is touching-on the touch panel 15 (step 51). When the player is touching-on the touch panel 15, the CPU core 21 advances the processing to step 52. When the player is in a touch-off state, the CPU core 21 advances the processing to step 56.

In step 52, the CPU core 21 determines whether or not the touch input coordinate pair of the touch panel 15 which is touched by the player is within the guidance mode arrange A1 (see FIG. 4). As shown in FIG. 10, the touch input coordinate pair which is input through the touch panel 15 is stored on the RAM 24 as a touch input coordinate pair DC1 when necessary. Also in the RAM 24, a target coordinate pair DC2, a first player object coordinate pair DC3, a locus coordinate pair DC4, a second player object coordinate pair DC5, a game screen display coordinate pair DC6, an item position coordinate pair DC7 and the like are stored when necessary as position data DC for creating a game image. Further in the RAM 24, a first player object image DI1, a second player object image DI2, a target object image DI3, a locus image DI4, a background image DI5, an item image DI6, an enemy object image ID7 and the like are stored when necessary as game image data DI for creating a game image.

When the touch input coordinate pair DC1 is within the guidance mode range A1, the CPU core 21 transfers the game to the guidance mode, and advances the processing to step 53. When the touch input coordinate pair DC1 is outside the guidance mode range A1, the CPU core 21 executes different processing based on the touch input coordinate pair DC1 in a non-guidance mode (for example, obtains an item I) (step 63), and advances the processing to step 56. The item I is obtained as follows. The CPU core 21 uses the item image DI6 to locate an item image (see FIG. 3) at a position based on the item position coordinate pair DC7. The CPU core 21 determines whether or not the touch input coordinate pair matches the position at which the item I is displayed. When the positions match each other, the CPU core 21 obtains the item I.

In step 53, the CPU 21 determines whether or not the touch input coordinate pair DC1 of the touch panel 15 which is touched by the player is within the guidance display range A2 (see FIG. 5). When the touch input coordinate pair DC1 is within the guidance display range A2 (FIG. 5 and FIG. 6), the CPU core 21 advances the processing to step 54. When the touch input coordinate pair DC1 is outside the guidance display range A2 (FIG. 7), the CPU core 21 advances the processing to step 55.

In step 54, the CPU core 21 sets the target coordinate pair DC2 in accordance with the touch input coordinate pair DC1. Specifically, the CPU core 21 converts the touch input coordinate pair DC1 into a coordinate pair of the touched position in the game space (world coordinate pair) displayed on the second LCD 12, and stores the world coordinate pair on the RAM 24 as the target coordinate pair DC2. Then, the CPU core 21 advances the processing to step 56.

In step S55, the CPU core 21 sets the target coordinate pair DC2 in the guidance display range A2 in accordance with the touch input coordinate pair DC1. Specifically, the CPU core 21 converts the touch input coordinate pair DC1 into a world coordinate pair of the touched position in the game space displayed on the second LCD 12. The world coordinate pair is given by setting the Y direction coordinate at same value as that of the touch input coordinate pair DC1 and setting the X direction coordinate at a value closest to the touch input coordinate pair DC1 within the guidance display range A2. The resultant world coordinate pair is stored on the RAM 24 as the target coordinate pair DC2. Then, the CPU core 21 advances the processing to step 56.

In step 56, the CPU core 21 moves the world coordinate pair of the first player object P1 (the first player object coordinate pair DC3) toward the target coordinate pair DC2 by a predetermined distance or less and thus updates the first player object coordinate pair DC3 stored on the RAM 44. Then, the CPU core 21 advances the processing to the next step. As a result of step 56, the first player object coordinate pair DC3 is updated to be closer to the target coordinate pair DC2 by the predetermined distance or less. As a consequence, a game image in which the first player object P1 moves toward the target coordinate pair in accordance with the touch input coordinate pair at a certain velocity is displayed.

Next, the CPU core 21 moves the world coordinate pair of the first player object P1 (the first player object coordinate pair DC3) and the world coordinate pair of the target coordinate pair Pt1 (see FIG. 6; the target coordinate pair DC2) in the X direction in accordance with the moving velocity of the second player object P2, and thus updates the first player object coordinate pair DC3 and the target coordinate pair DC2 (step 57). As described above, the moving velocity of the second player object P2 in the X direction is determined by a calculation of the CPU core 21 which is performed in accordance with the position in the X direction of the touch panel 15 in the guidance display range A2 which is touch-operated by the player in the guidance mode (see FIG. 5). Then, the CPU core 21 advances the processing to the next step.

Next, the CPU core 21 stores a history of the world coordinate pairs along which the first player object P1 has moved in the game space on the RAM 24 as a group of locus coordinate pairs DC4. The CPU core 21 uses the locus image DI4 to create a locus object L connecting such a group of locus coordinate pairs DC4 in a time series manner (step 58), and advances the processing to the next step. Specifically, the CPU core 21 stores the first player object coordinate pair DC3 updated in step 57 on the RAM 24 as an additional locus coordinate pair DC4.

Next, the CPU core 21 moves the world coordinate pair of the second player object P2 (the second player object coordinate pair DC5) along the locus object L in the X direction in accordance with the moving velocity of the second player object P2 in the X direction, and updates the second player object coordinate pair DC5 (step 59). Then, the CPU core 21 advances the processing to the next step.

Next, the CPU core 21 sets the game screen display coordinate pair DC6 such that the screen is scrolled in the X direction of the game space in accordance with the moving velocity of the second player object P2 in the X direction, and creates a game image. This is performed as follows more specifically. The CPU core 21 determines positions of the target object P1t, the first player object P1, the locus object L, and the second player object P2 based on the target coordinate pair DC2, the first player object coordinate pair DC3, the locus coordinate pair DC4 and the second player object coordinate pair DC5. The CPU core 21 uses the first player object image DI1, the second player object image DI2, the target object image DI3 and the locus image DI4 to locate the object images at the respective positions. The CPU core 21 also uses the item image DI6 and the enemy object image DI7 to locate the object images at respective positions. Thus, the CPU core 21 creates a game image to be displayed on the second LCD 12, using the background image DI5 corresponding to the game screen display coordinate pair DC6 as a background of the game image. Next, the CPU core 21 displays the created game image on the second LCD 12 (step 60), and advances the processing to the next step.

Next, the CPU core 21 determines whether or not the player is touching the touch panel 15 (step 61). When the player is touching the touch panel 15, the CPU core 21 returns the processing to step 53 and repeats the above-described processing. When the player is in a touch-off state, the CPU core 21 determines whether or not to terminate the game (step 62). When the game is to be terminated, the CPU core 21 terminates the processing illustrated in FIG. 9. When the game is to be continued, the CPU core 21 returns the processing to step 51 and repeats the above-described processing.

Figure 11:
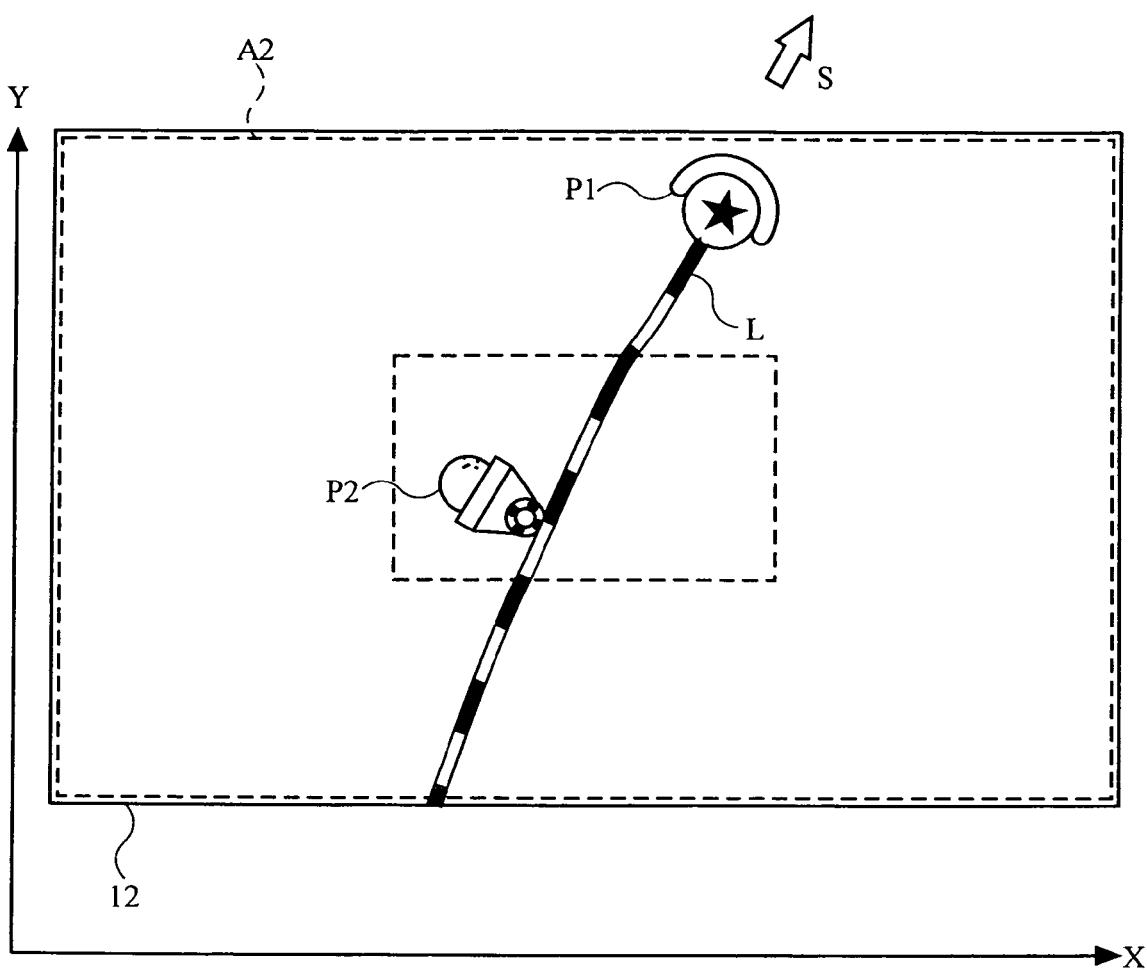
FIG. 11 shows an example of the second guidance display range A2, which is set as an area of a game image displayed on the second LCD 12 excluding a central part thereof.

In the above description, the guidance display range A2 is set in a right area of the game image displayed on the second LCD 12. Alternatively, the guidance display range A2 may be set in another area. For example, as shown in FIG. 11, an area of the game image displayed on the second LCD 12 excluding a central part thereof may be set as the guidance display range A2. With such a guidance display range A2, the player can move the first player object P1 in any direction. In this case, certain exemplary illustrative embodiments are similarly realized by setting the main moving direction of the first player object P1 and the second player object P2 and the direction in which the screen is to be scrolled (e.g., the X direction and the Xp direction in the above-described exemplary illustrative embodiment) to, for example, a direction in which the guided first player object P1 and the second player object P2 moving along the locus object L of the first player object P1 are connected.

According to the game apparatus for executing the game program in this exemplary illustrative embodiment, a game, in which the movement of the first player object P1 is controlled by the player using the touch panel 15 and the second player object P2 is moved along the locus of the first player object P1, can be continued even when the touch operation of the touch panel 15 is discontinued. Accordingly, a game based on a precondition that the touch panel is continuously touch-operated can be continued even when the touch operation is disconnected.

In the above exemplary illustrative embodiment, specific game processing operation and game data are provided for the purpose of giving a specific description. There are merely exemplary and the present invention is not limited to such game processing operation or game data. For example, a two-dimensional game space is used in the above exemplary illustrative embodiment, but certain exemplary illustrative embodiments are also applicable to game processing using a three-dimensional game space. The touch input panel coordinate pairs are converted into world coordinate pairs in the above exemplary illustrative embodiment, but the game processing may be executed based on the touch input panel coordinate pairs (e.g., the coordinate pairs on the display screen). In this case, the coordinate pairs on the display screen are stored on the RAM 24 as position data (see FIG. 10).

It is not necessary to display the first player object P1 in a game image. Certain exemplary illustrative embodiments can be similarly realized by drawing the locus object L as being created from the touched position. The first player object P1 may be a mark indicating the touch operation instead of the game object present in the virtual game space. In this case, the first player object P1 keeps the coordinate pair thereof on the display screen and is displayed at the coordinate pair as an indication mark. The coordinate pair of the first player object P1 on the display screen is converted into a coordinate pair in the virtual game space, and the second player object P2 is moved following the resultant coordinate pair.

In the above-described embodiment, the first LCD 11 and the second LCD 12 which are physically separated from each other are stacked as an upper screen and a lower screen as an example of two-screen liquid crystal display. The two-screen liquid crystal display may have another structure. For example, the first LCD 11 and the second LCD 12 may be provided on one main surface of the lower housing 13b side by side as a right screen and a left screen. Alternatively, a lengthy LCD having the same width as, and twice the length of, the second LCD 12 (i.e., an LCD which is physically provided as one LCD but has a two-screen display size in the length direction) may be provided on one main surface of the lower housing 13b, and a first game image and a second game image may stacked in such an LCD as an upper game image and a lower game image (e.g., the upper game image and the lower game image are displayed adjacent to each other with no border therebetween). Still alternatively, a wide LCD having the same length as, and twice the width of, the second LCD 12 may be provided on one main surface of the lower housing 13b, and a first game image and a second game image may located side by side in such an LCD as a left game image and a right game image (e.g., the left game image and the right game image are displayed adjacent to each other with no border therebetween). Namely, an LCD provided physically as one may be divided into two, so that the first game image and the second game image are displayed. With any of the forms of game screens, certain exemplary illustrative embodiments can be realized by locating the touch panel 15 on the screen displaying the second game image.

In the above-described exemplary illustrative embodiment, the touch panel 15 is integrally provided in the game apparatus 1. Certain exemplary illustrative embodiments are applicable to a structure in which the game apparatus and the touch panel are separate from each other. The touch panel 15 may be provided on the front surface of the first LCD 11. In the above-described exemplary illustrative embodiment, two display screens (the first LCD 11 and the second LCD 12) are provided. There may be one display screen. Namely, only the second LCD 12 with the touch panel 15 located thereon may be provided as a display screen without the first LCD 11 being provided. Alternatively, only the first LCD 11 with the touch panel 15 located thereon may be provided as a display screen without the second LCD 12 being provided.

In the above-described exemplary illustrative embodiment, the touch panel 15 is integrally provided in the game apparatus 1. Certain exemplary illustrative embodiments are applicable to an information processing apparatus (game apparatus) using a touch panel as one input means, such as a general personal computer or the like.

A storage medium having a game program stored thereon and a game apparatus according to certain exemplary illustrative embodiments allow a game, based on a precondition that a touch panel is continuously touch-operated, to be continued even if the touch operation is discontinued; and are useful as a storage medium having stored thereon a game program executable by a game apparatus, an information processing apparatus, or the like using a touch panel as an input device, and as such an apparatus.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored thereon a game program executable by a computer of a game-playing apparatus for displaying, on a display screen, a game image representing at least a part of a virtual space in which a first object is present, the game-playing apparatus including a touch coordinate pair input device for outputting coordinate information based on a predetermined coordinate system in accordance with a touch operation performed by a player, the game program causing the computer to at least execute:
   storing first object position data for determining a display position of the first object on the display screen;
   displaying the first object on the display screen based on the first object position data stored on the memory;
   storing indication position data representing an indication position on the display screen;
   detecting an input coordinate pair which is input by the touch coordinate pair input device;
   when an input coordinate pair is detected, updating the indication position data stored on the memory by adding, to the indication position data, indication position data indicating a new indication portion based on the input coordinate pair;
   updating the first object position data, regardless of whether or not input coordinate pairs are being detected;
   causing the first object to move based on the updating; and
   displaying a second object based on a trajectory, so as to target a position in the virtual space, represented by a history corresponding to the indication position data stored on the memory,
   wherein the first object is controllable by the player.

2. A non-transitory computer-readable storage medium having stored thereon the game program according to claim 1, wherein the second object is not directly controllable by the player.

3. A non-transitory computer-readable storage medium having stored thereon the game program according to claim 1, wherein:
when the player guides the first object in a first direction, the second object accelerates, and
when the player guides the first object in a second direction, the second object decelerates.

4. A non-transitory computer-readable storage medium having stored thereon the game program according to claim 3, wherein the first direction is substantially the same as the direction in which the second object is moving, and wherein the second direction is towards the second object.

5. A non-transitory computer-readable storage medium having stored thereon the game program according to claim 4, wherein the second object accelerates/decelerates only when the player guides the first object within a guide display range, the guide display range being only a portion of the display screen.

6. A non-transitory computer-readable storage medium having stored thereon the game program according to claim 1, wherein the first and second objects are at least initially spaced apart.

7. A game-playing apparatus for displaying, on a display screen, a game image representing at least a part of a virtual space in which a first object is present, the game-playing apparatus being operable by a touch coordinate pair input device for outputting coordinate information based on a predetermined coordinate system in accordance with a touch operation performed by a player, the game-playing apparatus comprising:
a storage location;
a first object position data storage controller configured to store, on the storage location, first object position data for determining a display position of the first object on the display screen;
a first object display controller configured to display the first object on the display screen based on the first object position data stored on the storage location;
an indication position data storage controller configured to store indication position data representing an indication position on the display screen;
a detector configured to detect an input coordinate pair that is input by the touch coordinate pair input device;
an indication position data update module that, when an input coordinate pair is detected by the detector, is configured to update the indication position data stored on the storage location by adding, to the indication position data, indication position data indicating a new indication portion based on the input coordinate pair; and
a first object position update module configured to update the first object position data, regardless of whether or not input coordinate pairs are being detected by the detector,
wherein the first object is caused to move based on the updates from the first object position update module;
wherein a second object is displayed based on a trajectory, so as to target a position in the virtual space, represented by a history corresponding to the indication position data stored on the storage location, and
wherein the first object is controllable by the player.

8. A game-playing apparatus according to claim 7, wherein the second object is not directly controllable by the player.

9. A game-playing apparatus according to claim 7, wherein:
when the player guides the first object in a first direction, the second object accelerates, and
when the player guides the first object in a second direction, the second object decelerates.

10. A game-playing apparatus according to claim 9, wherein the first direction is substantially the same as the direction in which the second object is moving, and wherein the second direction is towards the second object.

11. A game-playing apparatus according to claim 10, wherein the second, object accelerates/decelerates only when the player guides the first object within a guide display range, the guide display range being only a portion of the display screen.

12. A game-playing apparatus according to claim 7, wherein the first and second objects are at least initially spaced apart.

* * * * *